Oct. 24, 1933.  F. D. SCHNEIDER ET AL  1,932,148
MIXING VALVE
Filed Sept. 22, 1930   3 Sheets-Sheet 3

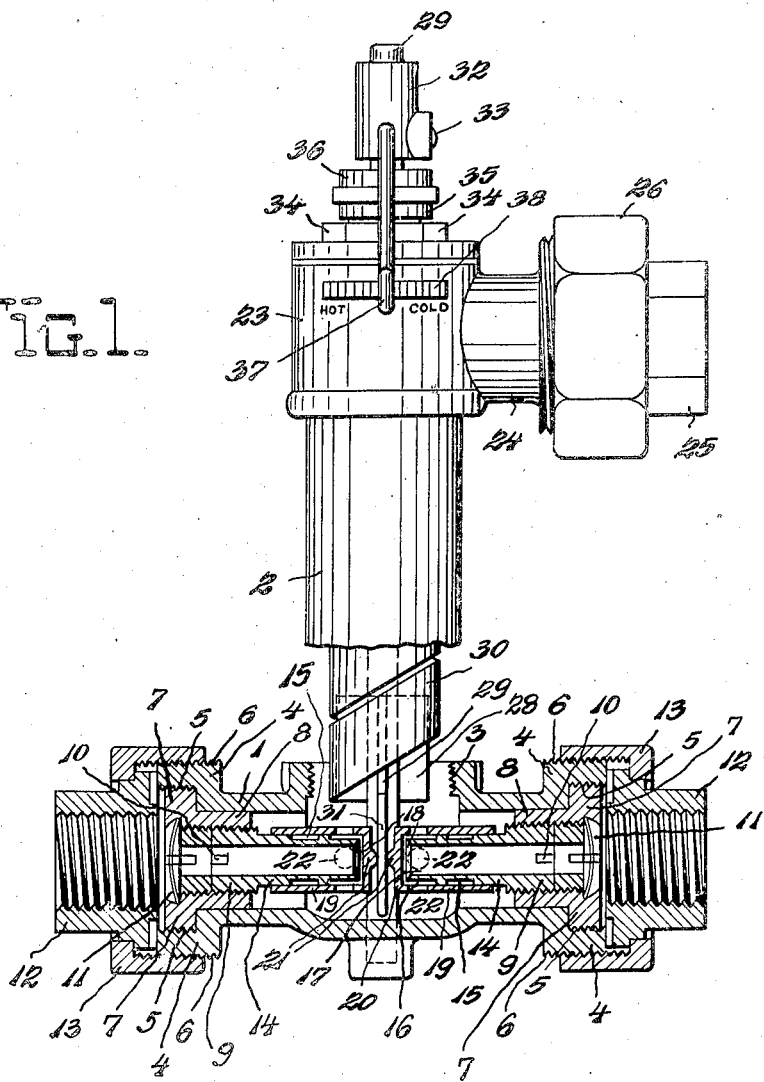

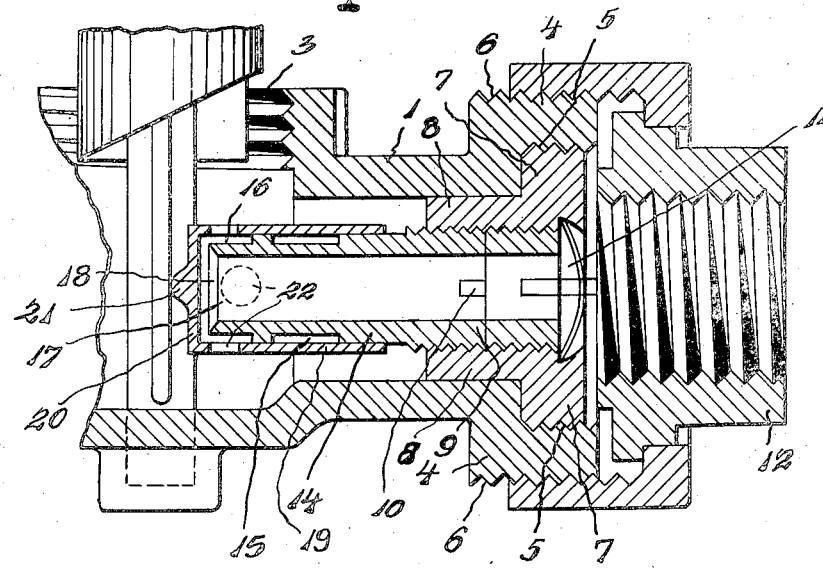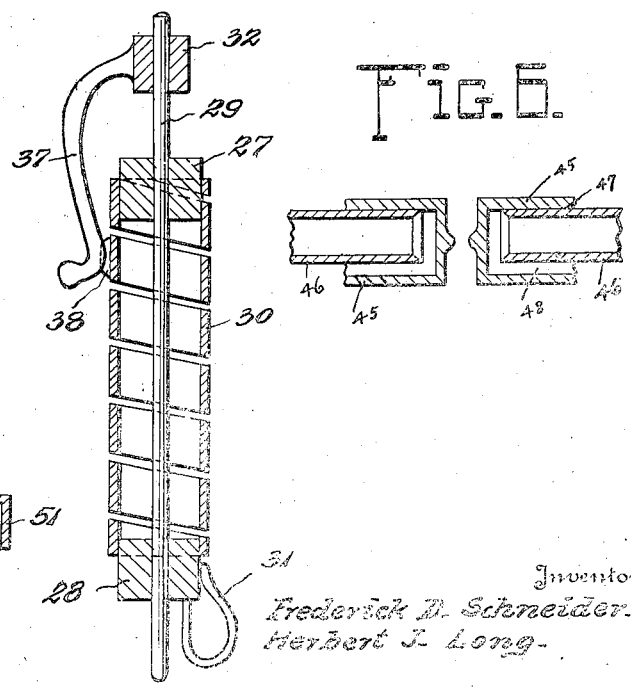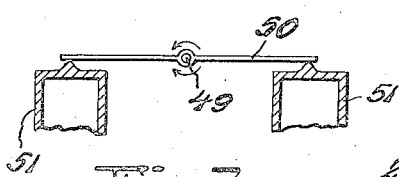

Inventors
Frederick D. Schneider.
Herbert J. Long.

By
Attorney

Patented Oct. 24, 1933

1,932,148

UNITED STATES PATENT OFFICE 1,932,148

MIXING VALVE

Frederick D. Schneider, Hillside, and Herbert J. Long, New Brunswick, N. J., assignors to The Kompak Co., New Brunswick, N. J.

Application September 22, 1930
Serial No. 483,552

30 Claims. (Cl. 236—12)

Our invention pertains to a mixing valve and more particularly to one especially adapted for mixing hot and cold water for domestic use.

Water heating is ever becoming more important. The demand is for automatic water heaters. Both gas and electric companies are concentrating on the sale of automatic water heaters. The electric companies are selling electric water heaters that heat only during off-peak loads. They use a comparatively large tank, thoroughly insulated. They carry the water near boiling point and use a mixing valve so that the water is delivered from the tank at around 130 degrees. The gas companies are feeling this competition. We believe that the future automatic gas water heater shall be one with a somewhat well insulated and larger tank, small rate gas consumption so that it may burn more or less continuously over the twenty-four hours, yet carry the water near boiling point and have a mixing valve to deliver the water around one hundred and thirty (130°) degrees. With this small demand gas load, the gas companies could reduce the price of gas and thus better compete with electricity. A reliable, inexpensive, mixing valve has been badly needed. There is one good marketed valve, but it is very expensive, around one hundred ($100.00) dollars. It is built with balanced valves. The cheaper mixing valves on the market are not reliable nor sensitive enough.

A mixing valve should not vary the temperature of delivered water regardless of the temperatures of the hot and cold water. It should shut the cold supply completely when called upon to do so. Example: Valve set for one hundred and thirty (130°) degrees, water supply in tank becomes exhausted and temperature drops from near boiling to one hundred and thirty (130°) degrees. The temperature of the mixed water should not drop below one hundred and thirty (130°) degrees until the temperature of the hot water in the tank has dropped below one hundred and thirty (130°) degrees. These are theoretically perfect conditions. Most valves do not come within ten (10) to twenty (20) degrees of this. The valve embodying this invention is within two degrees perfect.

The difficulty of getting perfect results in a mixing valve is due to the fact that the available thermostatic power is so slight that friction and valve seating create a problem. One has to reckon with water pressure, indeed, varying water pressures. The expensive valve referred to above, uses balanced valves. Balanced valves are theoretically independent of water pressures, but they are complicated to build and to service and have considerable friction to overcome and only the power of a thermostatic element to effect operation. The ordinary globe valve type of valve can be seated either with the water pressure, or against it. Experiments have shown that neither work satisfactorily. Seating with the pressure you get pronounced water hammer. When the valve is near seating the pressure is greater than the power of the thermostatic element causing valve to slam closed. The change in temperature using a duplex mixing valve structure alternately reverses the process and likewise causes an objectional water hammer. Seating against the water pressure in the ordinary sense does not work because there is not enough power in the thermostatic element to hold the valve shut against the pressure.

The now successfully realized object of our invention has been to design a mixing valve to be reliable in operation, readily adjustable and comparatively simple and economical of manufacture. We have successfully demonstrated our valves by manufacture and use with water heaters which we have long built and sold. The latest manufactured design comprises a duplex construction with duplicated axially alined valves and an interposed thermostatically controlled actuator. Each valve comprises a pair of telescopically connected tubular parts, the inner one of which is open at both ends and the outer one of which is closed at one end, but provided near its closed end with one or more lateral outlets. That open end of the inner one of the two telescopically connected tubular parts, which is located interiorly of the outer one of the two telescopically connected parts, is of reduced size or, as exemplified, of reduced diameter, so that its outer defining surface is spaced from the juxtaposed inner defining annular surface of the enveloped outer part or sleeve. Moreover, experiment has determined that the establishment of a certain range for the ratio between the internal area of the closed end of the sleeve and the size of the interiorly positioned or discharging open end of the inner tubular part to be important. We have discovered an advantage in reamer-enlarging to conical form the discharging end of the inner tubular part with consideration of the thickness of its walls and the amount of space within the enveloping sleeve and the discharge end. Our valve utilizes a fraction of the water pressure to aid closure.

It is to be realized that the scope of our invention comprehends many equivalent constructions. The showing of the drawings and the particular description are merely specific exemplifications of a plurality of mechanical embodiments and arrangements.

Adverting to the drawings:

Figure 1 is an elevation of a mixing valve embodying the preferred form of our invention, one end being shown in section.

Figure 2 is an elevation of a thermostatic mechanism extracted from the casing.

Figure 3 is an enlarged view of one duplicated half of the sectioned part of Figure 1.

Figure 6 is a second modification wherein the tube and sleeve of each valve while slidably connected are not telescopically connected, instead, the sleeve loosely envelopes the tube.

Figure 7 is a third modification in which the axes of the valves are parallel instead of coinciding and are thermostatically controlled by the rock lever.

Figure 4:
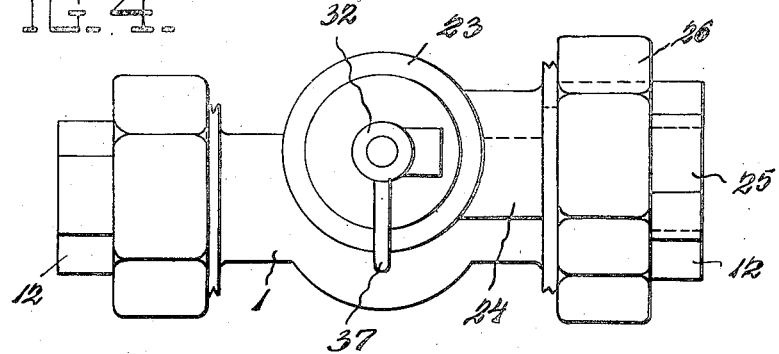
Figure 4 is a top plan view of the complete valve unit.

A structure, as exemplified in the lower end of Figure 1, has its two lateral ends, for entry of hot and cold water respectively, of duplicated design, wherefore only one half need by described and the singular number will be employed, though duplicated parts are designated by the same numeral. A hollow main valve body 1 has two lateral inlets and carries midway a thermostat housing and mixing chamber 2, which is in detachable threaded connection with the body at 3. Each inlet end of the body is enlarged at 4 and is fashioned interiorly with threads 5 and exteriorly with threads 6. The interior threads are for the detachable connection of an assembly sleeve 7 having an extension 8 of smaller diameter which is telescopically fitted in the valve body. In threaded connection with the sleeve extension 8 is the larger end 9 of a tubular member which is open at both ends and constitutes one of two complementary valve parts proper. The outer end (when inserted) of the tubular member 9 is fashioned with diametrically separated turning slots 10 intended for the reception of an adjusting tool end.

A hollow lock nut 11 is similarly fashioned with diametrical slots and is likewise adapted for threaded connection within the assembly sleeve and intended to maintain any predetermined established axial adjustment of the tubular valve member or cylinder 9. The arrangement just described, with the adjustment of the valve member 9 along the sleeve 7, as desired when the interior faces of the flange on the sleeve 7 abuts the shoulder on the enlarged extremity of the valve body, advantageously permits of the extraction of the sleeve 7 for cleaning of the tubular member 9, or access to the middle of the valve body without disturbing the adjusted connection between the sleeve 7 and the tubular valve member 9. A tail piece 12 is held in place by a union nut 13 which cooperates with the threads 6 on the valve body.

The smaller and longer end 14 of the tubular valve member or cylinder is vari-sized because fashioned about midway with an annular and exterior groove 15 and a second annular groove 16 which terminates at the inner end of the member 9. The purpose of the annular groove 15 is to reduce the area of contact and hence the friction between the member 9 and its complementary valve member with which it has telescopic connection, as will be presently described. The purpose of the annular groove 16 besides similarly reducing friction, is to provide space around the inner end of the tubular member 9 as part of an outlet passage for the inflowing water or other fluid medium. As will be more clearly seen in the enlargement of Figure 3, the inner open end 17 of the tubular member 9 is reamed out to provide an interiorly tapered or conical surface 18 which feature we consider to be an improving discovery to be later explained.

Telescopically fitted on the end 14, than which it is enough shorter to allow for adequate sliding movement thereon, is a valve sleeve 19 provided with a closing end wall 20 which is centrally and exteriorly fashioned with a projection 21. Near the end wall 20 the sleeve 19 is provided with a plurality of circumferentially arranged outlet holes 22 of which the drawings exemplify the presence of four.

We have discovered as a result of extended experiment that the interior area of the end wall 20 should be very nearly the same as the area defined by the purposely enlarged margin of the outlet end of the tubular member 9 or very nearly the same size as the outlet opening of the tubular member 9 at its reamed extremity, with consideration of the necessity of permitting free flow around the end of the member 9 to the holes 22 which are preferably large enough collectively so as not to restrict the free escape of water through the annular groove 16 as controlled by the proximity of the outlet extremity of the member 9 and the interior surface of the wall 20. The holes 22 might be circumferentially arranged in the end wall 20 radially outward or beyond the diametrical limits of the outer surface of the inner extremity of the tubular member 9, in order that when the extremity of the latter contacts the end wall 20 a closure may be effected—designedly of the cold water side. While we wish to have it clearly understood that a range of variation both as to absolute size and as to relative sizes of our valve parts may obtain and hence without suggesting any intended restriction, we state for general interest that the following sizes have been incorporated in our manufactured mixing valve which corresponds to the exemplification of Figure 3 of the drawings; interior diameter of the sleeve 19 thirteen thirty-seconds of an inch ($\frac{13}{32}$"), exterior diameter of the inner extremity of the tubular member 9 as defined by the annular groove 16 five-sixteenths of an inch ($\frac{5}{16}$") and consequently three sixty-fourths of an inch (3/64") as the width of the annular space about the inner extremity of the tubular member 9 or as the depth of the annular groove 16. The arrangement of the parts as disclosed in Figure 3 is preferably so contrived that the holes 22 never become closed even after the marginal extremity of the tubular member 9 contacts with the wall 20, which is to say, there is always some free escape of water until the valve is shut.

The thermostat housing 2 surmounts an outlet casting 23 and a lateral projection 24 thereof for the passage of the mixed water, and is connected with another tail piece 25 by means of another union nut 26. Mounted within the housing 2 and casting 23 is thermostatic mechanism which will be rather briefly described because old in the art and because no claim is specifically made to its structure. The detached thermostatic unit is shown in Figure 2 to comprise spaced top and bottom guides 27 and 28 respectively, through both of which is fitted a rod 29, the upper extremity of which also appears to view in Figure 1. The upper guide 27 is tight, whereas the lower guide 28 is loose. Helically enveloping the guides is a bi-metal thermostatic strip element 30 composed of two different metals brazed together longitudinally and adapted to buckle in response to temperature changes to which the different metals composing the strip are variously sensitive whereby to effect slight turning action of the lower guide 28. The lower guide 28 carries a wing 31, best shown in Figure 2 by itself, but also shown in Figures 1 and 3 to be operatively interposed between the two duplicated projections 21 which are spacedly juxtaposed.

Exteriorly, the upper end of the rod 29 carries a manually adjustable collar 32 which is adjustably secured to the rod by means of a set screw 33. A bonnet 34 and a gland 35 and a gland nut 36 are interposed between the top of the casting 23 and the collar 32, but are of no consequence to our invention. Manual adjustment is effected by means of a finger 37, which is attached to the collar 32 and depends to a point alongside of the casting 23 where it is adapted yieldingly to occupy one of a series of arcuately spaced calibrating serrations 38. Manifestly, the manual turning adjustment of the rod 29 will control the time of initiation of movement of one or the other of the sleeves 19 as imparted by the pressure thereagainst of the thermostatically actuated wing 31.

In operation, assuming both duplicated valves to be partially open, heated water to be available and the wing 31 to be occupying some intermediate position and with consideration of a prior initial adjustment of the finger 37 calculated approximately to effect a setting for 130°, such an initial establishment of the position of the finger 31 will be maintained until the temperature of the mixture of hot and cold water flowing up through the housing 2 changes enough to cause an effective thermostatic actuation of the wing 31 to apply pressure against one or the other of the two projections 21. Assuming the cold water to enter from the right and the hot water to enter from the left with reference to Figure 1, when, for instance, the hot water supply or the temperature of the hot water becomes decreased and consequently the temperature of the mixed water, to which the thermostatic element is exposed, falls a predetermined number of degrees the thermostat will automatically function to swing the wing 31 toward the right and hence to slide the right side sleeve 19 toward the right whereby to restrict the passage around the inner extremity of the right side tubular member 9 and proportionately to curtail the amount of cold water supply. The holes 22 we have made collectively large enough so that there can be no interference with the free escape of water in an amount determined by the size of passage around the inner end of the valve member 9, which is in turn determined by the proximity of the end wall 20 to the larger diametered margin of the conical outlet surface 18. If the aggregate escape afforded by the holes 22 is reduced to a point where they can restrict, an undesirable pressure tending to close the opposite valve will result. It is important to have the area defined by the largest circle in the conical surface 18 as near in size as feasible to the area of the central circular inner surface of the end wall 20, because if the area of the opposed wall surface 20 is too much greater than the size of outlet opening of the tubular member 9 the desirably slight differential in opposed pressures will no longer obtain. Likewise, if the escape area of the holes 22 is less than the passage around the end of the tubular member 9 the differential pressures will also be unfavorably disturbed by causing back pressure.

The thermostatically actuated finger 31 is snugly interposed between the two juxtaposed projections 21 on the end walls of the sleeves. The relative sizes of the margins of the discharge openings of the cylindrical tubes 9 and of the interior of the closed ends of the sleeves are predeterminately established with the former pair slightly smaller than the latter pair whereby the pressure of the water against the end of the sleeve of one valve assists the thermostat in overcoming the counter water pressure in the other valve.

With a so-called balanced valve construction, two balanced valves are required, one for the cold water and one for the hot water and each balanced valve includes two valves proper on the ends of the single stem and two valve seats. When closing, one is with and the other is against the water pressure. We consider our construction superior to the duplex balanced valve arrangement irrespective of structural simplicity because when the water drops to a temperature of say one hundred and thirty (130°) degrees, our valve shuts off the cold water supply and we utilize a greater force acting to shut off the cold water, that is to say, we obtain the benefit of force in excess of the power of the thermostatic element, sufficient positively to close a valve yet not too much, owing to the small difference between the outside diameter of the cylinder and the inside diameter of the sleeve.

Actually, our marketed construction has the inside area of the end walls 20 amounting to twelve thousand nine hundred and sixty-two hundred thousandths (.12962 sq. in.) square inches, the diameter thirteen-thirty seconds ($\frac{13}{32}$") of an inch and the four drill holes 22 size number 20 (#20) with a total area of ten hundredths (.10). The outside diameter of the inner ends of the tubular members 9 is five-sixteenths ($\frac{5}{16}$") of an inch, which is therefore also the diameter of the valve seats or the larger margins of the conical surfaces 18. It is to be observed that the inside area of the end walls 20 less the area defined by the larger margin of the conical surfaces 18 equals five thousand two hundred and ninety-two hundred thousandths (.05292) which is less than the area of the four holes 22. Also, the five sixteenths ($\frac{5}{16}$) diameter is as near as practical to the thirteen-thirty seconds diameter of the end wall surfaces. Thus the difference in the size of the discharge extremities of the tubular members 9 and the size of the sleeves is just enough to allow for adequate water flow and the greater aggregate size of the four holes 22 with reference to such difference results in as little back pressure as possible. The design is calculated to realize a trifle more pressure tending to move one valve to its closed position, yet not enough to overcome the control of the thermostatic element. In consequence we can effectively obtain the benefit of something more than the power of the thermostatic element to shut a valve and actually do shut the cold water valve completely within a range of two degrees.

Initially, the projections 20 are adjusted for contact with the finger 31 and the inner extremities of each tubular member 9 is screwed back three quarters (¾) of a turn (twenty-seven threads to the inch) so as to allow for one eighteenth (1/18") of an inch of relative axial movement between the members 9 and their telescopically enveloped sleeves. Thereafter, the lock nuts 11 are tightened and either adjusted unit may be extracted with the assembly sleeve 7 as has been explained. Screens (not shown) may be inserted in any feasible manner as, for instance, by being clamped between the outer ends of the tubular members 9 and the lock nuts 11.

To recapitulate in part, our object has been the realization, during operation, of enough pressure from one valve to hold the opposed valve shut while avoiding an excess of such pressure, because too much would destroy the control power of the thermostatic element which would cause the valves alternately to open and close to create objectionable noise and to produce fluctuating temperatures. The closing force exerted by say, the hot water valve, is dependent upon the size of opening at the inner ends of the tubular members 9, the size of the annular space afforded by the annular grooves 16, less than or equal to, or very little larger than the area defined by the larger margin of the conical surface 18 and the amount of space between the inner end of the tubular member 9 and the end wall of the sleeve and which space is in effect the control passage, so that a certain amount of back pressure occurs against the interior side of the wall 20, whereby the total pressure thereagainst exceeds the water pressure in the tubular member 9 and the hot water wall 20 aids the finger 31 to push the cold water wall 20 to its closed position, or to maintain the cold water valve tightly closed against city pressure. The aggregate size of the four holes 22 is greater than the annular and end control passage so as not to disturb the control of the latter.

Two conditions may obtain (a) with faucets wide open and good water pressure and (b) a faucet partly open which is in effect a low water pressure condition, because the pressure throughout the valve body is substantially the same. Now, the relative sizes of the control passage, of the discharge end of the tubular member 9 and of the sleeve diameter are not important when faucets are wide open and when there is substantially the same amount of hot and cold water flow because duplicated parts of the mixing valve are balanced. The relative sizes become important when different amounts of hot and cold water flow occur in response to a thermostatic actuation. Assuming more cold water to be flowing than hot water, it is important that the control passage between the tube 9 and the sleeve 19 be less than or equal to or very little larger than the size of discharge opening of the tube. We realize that the central passage may be regulated by the size of the escape holes 22, but we found that to be inexpedient. It is also important that the area of the interior end wall 20 of the sleeve be only a trifle larger than the discharge outlet of the tube at 18; because, if the end wall area is too much larger than the opening 18 the force against the alinedly opposed cold water end wall will slam the hot water end wall against its seat, which is the margin of the conical opening 18, thereby prematurely closing the hot water valve against thermostatic control to cause an uneven or uncertain temperature control. Remembering that force equals pressure times area, such an undesirable condition might be overcome by making the size of the control passage greater than the size of the hole 18, because the back pressure would be lessened, however, the performance would not be so satisfactory when a faucet was only partly open and it was that which led to our discovery that it is best to have the sides of the control passage substantially equal to or little less or greater than the discharge opening and the inside area of the end wall 20 only slightly in excess of the area defined by the discharge opening 18.

Supposing the hot water valve to have become closed, if the end wall of the sleeve is too much larger than the discharge end of the tube, the hot water wall 20 would be held too tightly against its seat and would require too much of a temperature fluctuation before the thermostat accumulated enough power to reopen the hot water valve and hence cause an uneven or uncertain temperature control within insufficiently close limits. If a valve of the type of ours successfully operates under high water pressure, it will do so under low water pressure conditions because one obtains practically low pressure conditions when a faucet is partly opened with high pressure.

Figure 5:
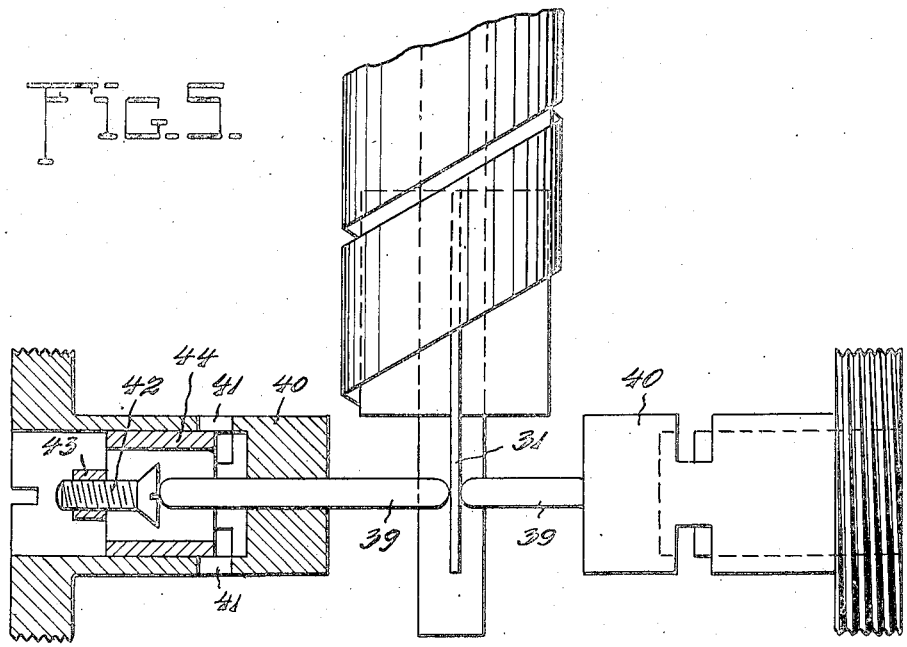
Figure 5 is an elevation of a modified form of our invention with one of its duplex constructions shown in section.

The modification disclosed in Figure 5 discloses the same thermostatically actuated finger 31 contactually interposed between a pair of stems 39 which are slidable through the ends of two alinedly opposed hollow members 40, having lateral outlets 41 near the inner surfaces of the end walls through which the stems 39 are slidable. The inner ends of the stems 39 contact with the heads respectively of set screws 42, which are in adjustable screw threaded connection with yokes 43 carried by one end of each of a pair of cylinder valves 44. Inspection will cause to make readily understood that the telescopic movement of either cylinder 44 is adapted to enlarge or restrict the size of the outlets 41 or entirely to close them when the inner end of either cylinder 44 approaches near enough to the interior surface of the end wall of its hollow member 40. Springs (not shown because common practice) may be operatively associated with the stems 39. This modified construction while of simpler design, requires a very precise telescopic fit between the hollow members 40 and the cylinders 44 to avoid leakage along such slidably fitted connection and at the same time to avoid a fit which would not involve excessive friction and more difficult factory adjustment.

The modification illustrated in Figure 6 is an earlier manufactured form of our invention wherein two comparatively larger diametered sleeves 45 are substituted for the two sleeves 19. Instead of being telescopically fitted upon the inner ends of tubular members 46, their interior diameter is enough greater than the exterior diameter of the tubes 46 so that they are gravitationally hung thereon respectively as a loose sliding connection, with frictional contact only along upper arcuate surfaces 47, whereby arcuate clearance space 48 is provided around the lower portions of the connections. In this form no lateral sleeve apertures are required, the controlling escape of water being past the margins of the open sleeve ends. While this structural form of our invention operated satisfactorily, the auxiliary control passage being governed solely by preestablished difference in diameters, the sliding movement of the sleeves was not so well guided to maintain their axial coincidence.

Our purpose to design a simple valve, not of the balanced type, led to the discovery that we could accomplish what we had in mind by means of a valve with slidably connected tubular parts. Of course, we finally employed duplicated valves in axial alinement. We have built our novel valve in two ways, both of which have accomplished the purpose in actual use in many installations. One form of our originated valve had a movable tube inside of a fixed sleeve and controlled the flow of water by covering and uncovering ports, thus closing and opening independently of the water pressure. The other (now preferred) form employed a movable sleeve slidably enveloping a fixed tube and this embodiment of our invention closes against the flow of water and has become the preferred construction, because, while in principle both designs embrace the same basic idea, to have the sleeve movable avoids the necessity of a close fit and hence its operation is more unlikely to become impaired by accumulated matter.

Figure 7 is a modification which we have deemed it wise to illustrate for the purpose of evidencing our realization that our duplex mixing valve construction is not to be construed to have its novelty dependent upon axially alined valves. We believe the axially alined valves require the simplest and cheapest operating mechanism and consequently involve the least operating friction. According to Figure 7 the turning movement of the guide 28 or the oscillatory movement of the wing 31 is utilized to control adjacently arranged hot and cold water valves of identical construction to that of our preferred form, but with their axes parallel instead of coinciding. The turning axis 49 of the thermostatic element carries a doubly armed rock lever 50 in substitution for the wing 31 and the extremities of the lever 50 are adapted to rise or fall and when either is actuated downwardly it will correspondingly depress the particular sleeve 51 with which it is adapted to contact.

We claim:

1. In a mixing valve, the combination of a casing provided with a pair of oppositely directed inlets and an outlet, a pair of separated sleeve valve units each comprising a cylinder and telescopically enveloping apertured sleeve, said valves being axially alined between said inlets and thermostatic means for alternately positively altering the relative positions of a telescopically fitted pair of said valve parts.

2. In a mixing valve, the combination of a casing provided with a pair of oppositely directed inlets and an outlet, a pair of sleeve valves each comprising a cylinder and enveloping apertured sleeve, said cylinders being separated and said sleeves being separated, said valves being axially alined between said inlets and thermostatic mechanism within said casing and including an actuatable finger interposed between said sleeves and adapted to control the differential flow through said valves.

3. In a valve of the character described, the combination of a casing, a valve including a sleeve and cylinder mounted in said casing, said sleeve having one closed end and being fashioned with a lateral outlet, said cylinder being adapted to close said outlet upon abutment of its end with said sleeve end wall, and a thermostatically operating finger adapted to impinge against and move said sleeve to its closing position.

4. In a valve of the character described, the combination of a casing, a telescopically fitted sleeve and cylinder mounted in said casing, a duplicated sleeve and cylinder axially alined with the first pair and in said casing, said sleeves having closed ends and each being fashioned with a lateral outlet, said cylinders being adapted to control said outlets respectively, thermostatic means for effecting relative movement between both sleeves and their cylinders, the sizes of the inner discharge ends of said cylinders being smaller than their telescopically fitted portions for the purpose specified.

5. In a water mixing valve of the character described, the combination of a casing, a cylinder fixedly mounted therein and fashioned with an exteriorly smaller discharge end, a sleeve fitted to slide on the exteriorly larger portion of said cylinder and having a closed end opposed to said smaller end of said cylinder and automatically operating for moving said sleeve to vary the amount of flow through the valve.

6. In a water mixing valve of the character described, the combination of a casing, a pair of axially alined cylinders fixedly mounted therein and each fashioned with a smaller discharge end, said ends being close to each other, sleeves fitted to slide on the larger portions of said cylinders respectively and each having a closed end opposed to the smaller end of its cylinder and also each having lateral apertures opposite the discharge end of its cylinder, and a thermostat including an actuating finger interposed between said closed sleeve ends, the relative sizes of the margins of the discharge openings of said cylinders and of the interior of the closed ends of the sleeves being predeterminately established with the former pair slightly smaller than the latter whereby the pressure of the water against the end of the sleeve of one valve assists the thermostat in overcoming the counter water pressure in the other valve.

7. In a mixing valve, the combination of a casing provided with a pair of alined oppositely directed inlets and an outlet, a telescopically fitted cylinder and sleeve at each of said inlets, thermostatic mechanism for effecting relative movement between both cylinders and their sleeves, plural means for effecting initial adjustments of one of each pair of telescopically fitted elements to determine the range of movement between said cylinders and sleeves and plural means for detachably connecting one of each pair of said telescopically fitted parts with said casing whereby to permit of extraction for cleansing or repair without disturbing said initial adjustments.

8. In a mixing valve, the combination of a casing provided with an inlet and an outlet, a telescopically fitted cylinder and sleeve at said inlet, mechanism for effecting relative movement between said cylinder and said sleeve, means for effecting initial adjustment of said cylinder and means for detachably connecting one of said telescopically fitted parts with said casing whereby to permit of extraction for cleansing or repair without disturbing said initial adjustment.

9. In a mixing valve the combination of a composite casing having two opposed inlets and an intermediary mixing chamber, cylinders detachably secured in axial alinement between said inlets and having near ends spaced apart at said chamber, sleeves slidably enveloping said cylinders respectively and having closed ends juxtaposed between the rear ends of said cylinders, said sleeves being fashioned with apertures in communication with said chamber and a thermostat adapted to move either of said sleeves to vary the possible flow from said cylinders to said apertures.

10. In a mixing valve the combination of a composite casing having two opposed inlets and an intermediary mixing chamber, cylinders detachably secured in axial alinement between said inlets and having near ends interiorly tapered and spaced from each other at said chamber, sleeves slidably enveloping said cylinders respectively and having closed ends juxtaposed between the near ends of said cylinders and spaced laterally therefrom respectively, said sleeves being fashioned with apertures in communication with said chamber and a thermostatically actuated element interposed between the ends of said sleeves and adapted to move either, whereby to vary the possible flow around the near ends of said cylinders to said apertures.

11. In an appliance of the character described, the combination of a casing having an inlet and an outlet, a valve for controlling said inlet and including a pair of slidably connected tubular members and means for sliding one tubular member along the other, the dimensional arrangement of the passage through the cooperating pair of members being contrived with the inlet through one of said members constantly smaller than the outlet through the other of said members within the range of control of said means whereby to constitute the control section of the passage.

12. In an appliance of the character described, the combination of a casing having two inlets and a common outlet, a pair of valves for controlling said inlets respectively and each including a pair of tubular members one of which encloses the other and means for simultaneously controlling the position of said valves, the dimensional arrangement of the passage through the cooperating pair of members of each valve being contrived with the inlet through one of said members constantly smaller than the outlet through the other of said members within the range of control of said means whereby to constitute the control section of the passage and to realize a force slightly in excess of the fluid pressure during closing movement of one of said valves.

13. In an appliance of the character described, the combination of a casing having two inlets and a common outlet, a pair of valves for controlling said inlets respectively and each including a tubular member and telescopically enveloping sleeve and thermostatic means for alternately actuating one sleeve of one of said valves, the dimensional arrangement of the passage through the tubular member and sleeve of each valve being contrived with the inlet through the former constantly smaller than the outlet through the latter within the range of actuation of said thermostatic means whereby to constitute the control section of the passage and to realize a force slightly in excess of the fluid pressure during closing movement of one of said valves.

14. In a water mixing valve structure, the combination of a casing provided with a pair of distinct water inlets and a common outlet, a pair of valves for said inlets respectively and each comprising a pair of hollow members one of which envelopes the other, an open end of each of the inner ones of said hollow members being juxtaposed to an end wall of the outer hollow members respectively, actuating means operatively connecting said valves and adapted to effect a relative movement between the pair of hollow members of one valve, said outer hollow members being fashioned with outlets constantly larger than the passage around the open ends of said inner hollow members within the range of movement of said actuating means, the comparative cross-sectional sizes of said inner and outer hollow members being predeterminably so chosen as to leave passages therebetween adapted to afford communication between the discharge ends of the inner hollow members and said outlets respectively, said passages being approximately equal in size to the discharge ends of the inner hollow members whereby said passages control the flow through the valves as auxiliary to the control of said actuating means whereby when one valve is being closed the other assists within nicely prescribed limits in overcoming the water pressure.

15. In a water mixing valve structure, the combination of a casing provided with a pair of oppositely disposed inlets and a common outlet, a pair of valves for said inlets respectively and each comprising a tube and enveloping sleeve, an open end of each tube being juxtaposed to an end wall of the sleeves respectively, a thermostatically controlled element contactually interposed between said sleeves and adapted alternately to effect the closing movement of one thereof along its tube, said sleeves being fashioned with outlets constantly larger than the passage around the open ends of said tubes within the range of movement of said thermostatic element, the comparative cross-sectional sizes of said inner and outer valve members being predeterminably so chosen as to leave passages therebetween adapted to afford communication between the discharge ends of the inner valve members and said outlets respectively, said passages being approximately equal in size to the discharge ends of the inner valve members whereby said passages being smaller than said sleeve outlets constitute an auxiliary control to that of said thermostatic element and whereby the closing movement of one sleeve is assisted within nicely prescribed limits by the other sleeve in overcoming the water pressure against the former.

16. In a mixing valve, the combination of a casing provided with a pair of inlets and an outlet, a pair of valves at said inlets, said valves each including a tube and enveloping sleeve, means for adjusting one valve couple bodily relative to the other and thermostatically actuated means for controlling the operation of both of said valves.

17. In a mixing valve, the combination of a casing provided with a pair of inlets, valve structures fitted in said inlets, a thermostatically actuated element mounted in said outlet and responsive to the temperature of the mixed water adapted to flow therethrough, said valves comprising separated pairs of slidably connected hollow members, corresponding members of said valves respectively being separated, the arrangement being such that one hollow member of each valve is adapted independently to be moved by said element whereby to control the flow through said valves.

18. In a water mixing valve, the combination of a casing provided with a pair of hot and cold water inlets respectively, valve structures adjustably fitted in said inlets, a thermostatically turnable element mounted in said outlet and responsive to the temperature of the mixed water adapted to flow therethrough, each of said valves comprising coaxial and slidably connected tubular members, and means operatively connecting said turnable element with a pair of tubular members of said valves respectively.

19. In a water mixing valve of the character described, the combination of a casing, a cylinder fixedly mounted therein and fashioned with an interiorly reamed discharge end, a sleeve around the discharge end of said cylinder and having an end wall opposed to said discharge end of said cylinder the interior size of said sleeve very slightly exceeding the larger margin of the reamed portion of said cylinder and means for effecting relative movement between said sleeve and cylinder to vary the amount of flow through the valve.

20. In an appliance of the character described, the combination of a mixing chamber having an inlet, a cylinder detachably secured in said inlet, a sleeve enveloping the inner end of said cylinder and having an end wall juxtaposed to said inner cylinder end, the inner end of said cylinder being interiorly reamed whereby to make its extremity approach as closely as possible the interior size of the sleeve, said sleeve being fashioned with an aperture in communication with said chamber and a thermostatically actuated element adapted to engage the end wall of said sleeve whereby to move it along said cylinder to vary the possible flow through the inner discharge end of said cylinder to said aperture according to the proximity of said wall and reamed cylinder end.

21. In a mixing valve, the combination of a casing provided with a pair of inlets and an outlet, a pair of valves at said inlets respectively, said valves each including a cylinder and enveloping sleeve and thermostatically actuated means for actuating said sleeves along said cylinders one constantly independently of the other.

22. In a water mixing valve, the combination of a casing provided with a hot water inlet and a cold water inlet, a thermostatically actuable element operatively mounted between said inlets and responsive to the temperature of the mixed water and valve structures adjustably fitted in said inlets respectively, each of said valve structures including a cylinder open at both ends and a sleeve so enveloping that end of its cylinder which is nearest to said thermostatic element as to provide clearance between each sleeve and cylinder and as to provide a limited range of sleeve movement between said thermostatic element and the enveloped end of the cylinder.

23. In a valve of the character described, the combination of a casing, a cylinder and enveloping sleeve mounted in said casing, another cylinder and sleeve mounted for relative movement in said casing, said sleeves each adapted to form in conjunction with its cylinder a passage therebetween and means for effecting relative movement between said sleeves and cylinders, the sizes of the discharge ends of said cylinders being smaller than the clearance between the appositioned surfaces of said sleeves and cylinders for the purpose specified.

24. In a mixing valve, the combination of a casing provided with a pair of inlets and with an outlet, a pair of valves at said inlets respectively, said valves each including a cylinder adjustably mounted in said casing and a cylinder-enveloping sleeve and means interposed between the ends of said sleeves for alternatively actuating one sleeve along its cylinder.

25. In a mixing valve, the combination of a casing provided with a pair of inlets and with an outlet, a pair of valves at said inlets respectively, said valves each including a member fashioned with a passage therethrough and a cylinder-enveloping sleeve, means for actuating each member relative to its sleeve and means for alternatively actuating a sleeve along one of said members.

26. In a mixing valve, the combination of a casing provided with a pair of inlets and with an outlet, a pair of valves at said inlets, said valves each including a pair of interfitted hollow members and automatically operating means for positively though alternatively actuating only one member of one of said valves.

27. In an appliance of the character described, the combination of a casing having a pair of inlets and an outlet, valves for controlling said inlets and each including a pair of tubular members one of which surrounds the other and means adapted to actuate corresponding ones of said tubular members axially, the dimensional arrangement of the passage through the cooperating pair of tubular members being contrived so that the passage through the inner one of said members is smaller than the outlet through the outer one of said members.

28. In a mixing valve, the combination of a casing provided with an inlet and an outlet, an assembly sleeve detachably fitted in said inlet, a cylinder adjustably connected with said assembly sleeve, a sleeve slideably enveloping a portion of said cylinder and means for affecting relative movement between said cylinder and sleeve.

29. In a water mixing valve of the character described, the combination of a casing, a pair of hollow members mounted therein and having discharge ends in apposition, sleeves surrounding said hollow members respectively and each having an end wall opposed to the discharge end of its hollow member and an actuator cooperating with the sleeve ends, the relative sizes of the margins of the discharge openings of said hollow members and of the interior of the sleeves being predeterminately established with the former pair slightly smaller than the latter whereby the pressure of the water against the end of the sleeve of one valve assists the actuator in overcoming the counter water pressure in the other valve.

30. In an appliance of the character described, the combination of a mixing chamber provided with an outlet and having a pair of inlets, a cylinder detachably secured in each inlet, a sleeve enveloping the inner end of each cylinder and having an end wall juxtaposed to its enclosed cylinder end, said sleeve being in communication with said chamber, a thermostatically actuated element adapted alternatively to engage the end wall of one of said sleeves whereby to move it along said cylinder to vary the possible flow through the inner discharge end of said cylinder and through said sleeve to said chamber according to the proximity of said wall and cylinder end and means for initially adjusting the position of said element.

FREDERICK D. SCHNEIDER.
HERBERT J. LONG.